US012794132B2

(12) United States Patent
Kelley

(10) Patent No.: US 12,794,132 B2
(45) **Date of Patent: *Nov. 10, 2026**

(54) SPIRAL WIDEBAND LOW FREQUENCY ANTENNA

(71) Applicant: Taoglas Group Holdings Limited, Enniscorthy (IE)

(72) Inventor: Timothy Patrick Kelley, San Diego, CA (US)

(73) Assignee: Taoglas Group Holdings Limited, Enniscorthy (IE)

( * ) Notice: Subject to any disclaimer, the term of this patent is extended or adjusted under 35 U.S.C. 154(b) by 135 days.

This patent is subject to a terminal disclaimer.

(21) Appl. No.: 18/774,703

(22) Filed: Jul. 16, 2024

(65) Prior Publication Data

US 2025/0055195 A1 Feb. 13, 2025

Related U.S. Application Data

(63) Continuation of application No. 18/130,085, filed on Apr. 3, 2023, now Pat. No. 12,051,861, which is a continuation of application No. 17/393,930, filed on Aug. 4, 2021, now Pat. No. 11,621,492, which is a continuation of application No. 16/457,623, filed on Jun. 28, 2019, now Pat. No. 11,088,455.

(60) Provisional application No. 62/691,362, filed on Jun. 28, 2018.

(51) Int. Cl.

| | |
|---|---|
| ***H01Q 1/36*** | (2006.01) |
| ***H01Q 1/38*** | (2006.01) |
| ***H01Q 9/27*** | (2006.01) |

(52) U.S. Cl.

CPC ................. *H01Q 9/27* (2013.01); *H01Q 1/38* (2013.01)

(58) Field of Classification Search

CPC .. H01Q 1/36; H01Q 1/38; H01Q 1/48; H01Q 9/27

See application file for complete search history.

(56) References Cited

U.S. PATENT DOCUMENTS

| | | | | |
|---|---|---|---|---|
| 3,504,368 A | | 3/1970 | Ruben | |
| 4,525,720 A | | 6/1985 | Corzine et al. | |
| 4,725,848 A | | 2/1988 | Honda | |
| 5,220,340 A | * | 6/1993 | Shafai .................... | H01Q 3/247 343/895 |
| 5,451,973 A | | 9/1995 | Walter et al. | |
| 5,453,752 A | * | 9/1995 | Wang .................... | H01Q 25/04 343/824 |
| 5,508,710 A | | 4/1996 | Wang et al. | |

(Continued)

FOREIGN PATENT DOCUMENTS

| | | |
|---|---|---|
| WO | 2016067269 | 5/2016 |

OTHER PUBLICATIONS

Jung, et al. Reconfigurable Scan-Beam, Single-Arm spiral Antenna Integrated with RD-MEMS Switches, IEEE (Feb. 6, 2006).

(Continued)

*Primary Examiner* — Tho G Phan

(74) *Attorney, Agent, or Firm* — Garson & Gutierrez, PC

(57) ABSTRACT

An antenna may include a ground plane, a tuning stub, and a shorted spiral antenna element connected to the tuning stub. The shorted spiral antenna element may include a plurality of spiral traces shorted together by a shorting element extending radially outward to contact each of the spiral traces.

20 Claims, 8 Drawing Sheets

(56) References Cited

U.S. PATENT DOCUMENTS

| | | | | |
|---|---|---|---|---|
| 5,589,842 | A | 12/1996 | Wang et al. | |
| 5,621,422 | A | 4/1997 | Wang | |
| 5,815,122 | A | 9/1998 | Nurnberger et al. | |
| 5,929,825 | A | 7/1999 | Niu et al. | |
| 5,936,594 | A | 8/1999 | Yu et al. | |
| 5,990,849 | A | 11/1999 | Salvail et al. | |
| 6,765,542 | B2 * | 7/2004 | McCarthy | H01Q 9/27 343/895 |
| 6,842,158 | B2 | 1/2005 | Jo et al. | |
| 6,856,286 | B2 | 2/2005 | Jo et al. | |
| 6,862,004 | B2 | 3/2005 | Alexopoulos et al. | |
| 6,897,817 | B2 | 5/2005 | Jo et al. | |
| 6,917,346 | B2 | 7/2005 | Izzat et al. | |
| 7,423,592 | B2 * | 9/2008 | Pros | H01Q 5/307 343/702 |
| 7,586,462 | B1 | 9/2009 | Tetorka | |
| 7,692,603 | B1 | 4/2010 | Cencich et al. | |
| 7,750,861 | B2 | 7/2010 | Delgado et al. | |
| 8,174,454 | B2 | 5/2012 | Mayer | |
| 8,552,922 | B2 | 10/2013 | Igwe | |
| 8,749,451 | B1 | 6/2014 | Zamarron et al. | |
| 8,847,846 | B1 | 9/2014 | Diaz | |
| 9,065,176 | B2 | 6/2015 | Wang | |
| 9,118,115 | B2 | 8/2015 | Alexopoulos et al. | |
| 9,362,614 | B1 * | 6/2016 | Neel | H01Q 1/50 |
| 9,450,300 | B2 | 9/2016 | Yemelong | |
| 9,490,541 | B2 | 11/2016 | Tayama et al. | |
| 9,917,356 | B2 | 3/2018 | Jeon et al. | |
| 10,665,961 | B1 | 5/2020 | Mcmahon et al. | |
| 10,686,250 | B1 | 6/2020 | Oster et al. | |
| 11,929,541 | B2 * | 3/2024 | Kaufmann | H01Q 9/0435 |
| 12,051,861 | B2 * | 7/2024 | Kelley | H01Q 9/27 |
| 12,308,535 | B2 * | 5/2025 | Karilainen | H01Q 1/36 |

OTHER PUBLICATIONS

Nakano, et al. Low-Profile Equiangular Spiral Antenna Backed by an EBG Reflector, IEEE (May 5, 2009).

* cited by examiner

SPIRAL WIDEBAND LOW FREQUENCY ANTENNA

CROSS-REFERENCE TO RELATED APPLICATIONS

This application is a continuation of, and claims the benefit of priority to, U.S. patent application Ser. No. 18/130,085 filed Aug. 3, 2023 of the same title, which is a continuation of, and claims the benefit of priority to, U.S. patent application Ser. No. 17/393,930 filed Aug. 4, 2021 of the same title, which is a continuation of, and claims the benefit of priority to, U.S. patent application Ser. No. 16/457,623 filed Jun. 28, 2019 of the same title, which in term claims the benefit or priority to U.S. Provisional Patent Application Ser. No. 62/691,362 filed Jun. 28, 2018 and entitled "SPIRAL WIDEBAND, LOW FREQUENCY ANTENNAS AND METHODS", each of which is hereby incorporated herein by reference in its entirety.

TECHNICAL FIELD

Embodiments described herein relate to wideband antennas.

DESCRIPTION OF RELATED TECHNOLOGY

Low band antenna elements may include several linear regions that are routed until the antenna element is long enough to resonate at a desired center frequency of the low band. However, such designs may have limited bandwidth at the center frequency.

Many embodiments of spiral antennas are center-fed and many embodiments of spiral antennas require an input impedance of around 150 ohms. In contrast, most commercial radios have an input impedance of only 50 ohms. Many embodiments of spiral antennas contain two arms working in quadrature.

SUMMARY OF THE INVENTION

In one broad aspect, an antenna is described, the antenna including a substrate, a first element supported by a first region of the substrate, the first element including a shorting portion, a first curved antenna trace extending from a first side of the shorting region to a second side of the shorting region opposite the first side of the shorting region, and a second curved antenna trace extending from the first side of the shorting region to the second side of the shorting region, the second curved antenna trace within the first curved antenna trace and in electrical communication with the first curved antenna trace through the shorting portion, and a tuning stub supported by a second region of the substrate and in electrical communication with the first element.

In one aspect, the antenna may also include a ground plane supported by a third region of the substrate. In one aspect, the may also include a central region free from conductive material, the first and second curved antenna traces extending around the central region. In one aspect, the first curved antenna trace and the second curved antenna trace may be concentric.

In one aspect, the first element may include a plurality of antenna traces formed along portions of a spiral. In a further aspect, the spiral may be generally elliptical in shape. In a further aspect, the spiral may be elongated in a first direction, having a major dimension extending between the portions of the spiral furthest apart from one another and a minor dimension perpendicular to the major dimension In a still further aspect, the tuning stub may be L-shaped and includes a first leg and a second leg perpendicular to the first leg, the longer of the first and second legs extending generally parallel to the minor dimension of the spiral of the first antenna element.

In one aspect, the first element may include a shorted spiral antenna element. In one aspect, the first curved antenna trace may extend from a first point on the first side of the shorting region to a second point on the second side of the shorting region opposite the first side of the shorting region, the second point located radially outward of the first point from a central region of the first element.

In another broad aspect, a spiral antenna is described, the spiral antenna including a spiral element including an interior end, an exterior end and a plurality of shorted curved arms connected by a shorted spiral arm element, a tuning stub connected to the spiral element, a ground plane, and a substrate.

In one aspect, the tuning stub may be L-shaped or T-shaped. In one aspect, the tuning stub may have a first section having a first width and a second section having a second width greater than the first width. In one aspect, the tuning stub may be located adjacent at least two sides of the ground plane. In one aspect, the ground plane may have a first ground plane width and a second ground plane width, greater than the first ground plane width. In one aspect, the spiral antenna may further include a coaxial cable connected to the tuning stub at a first connection point and connected to the ground plane at a second connection point.

In one aspect, each of the plurality of shorted curved arms may be separated from adjacent curved arms by gaps extending between the plurality of shorted curved arms. In a further aspect, the gaps extending between the plurality of shorted curved arms may have varying widths.

In one aspect, the spiral element may have an oval shape. In one aspect, the exterior end of the spiral element may be connected to the tuning stub midway along a width. In one aspect, the antenna may have an input impedance of 50 ohms.

In another broad aspect, a spiral antenna is described, the spiral antenna including a tuning stub, a ground plane, a spiral element connected to the tuning stub, the spiral element including a first spiral arm having an interior end, a second spiral arm having an exterior end, a shorting element, and a plurality of spiral arms, each of the plurality of spiral arms connecting at a first end to a first side of the shorting element and connecting at a second side to a second side of the shorting element, and a substrate.

In one aspect, the tuning stub may be spaced apart from two sides of the ground plane by a gap. In one aspect, each of the plurality of spiral arms may be separated from one another by one of a plurality of spiral gaps. In a further aspect, a width of the plurality of spiral gaps may vary. In one aspect, the antenna may have an input impedance of 50 ohms.

BRIEF DESCRIPTION OF DRAWINGS

Embodiments of this disclosure will now be described, by way of non limiting examples, with reference to the accompanying drawings.

DETAILED DESCRIPTION

Figure 1A:
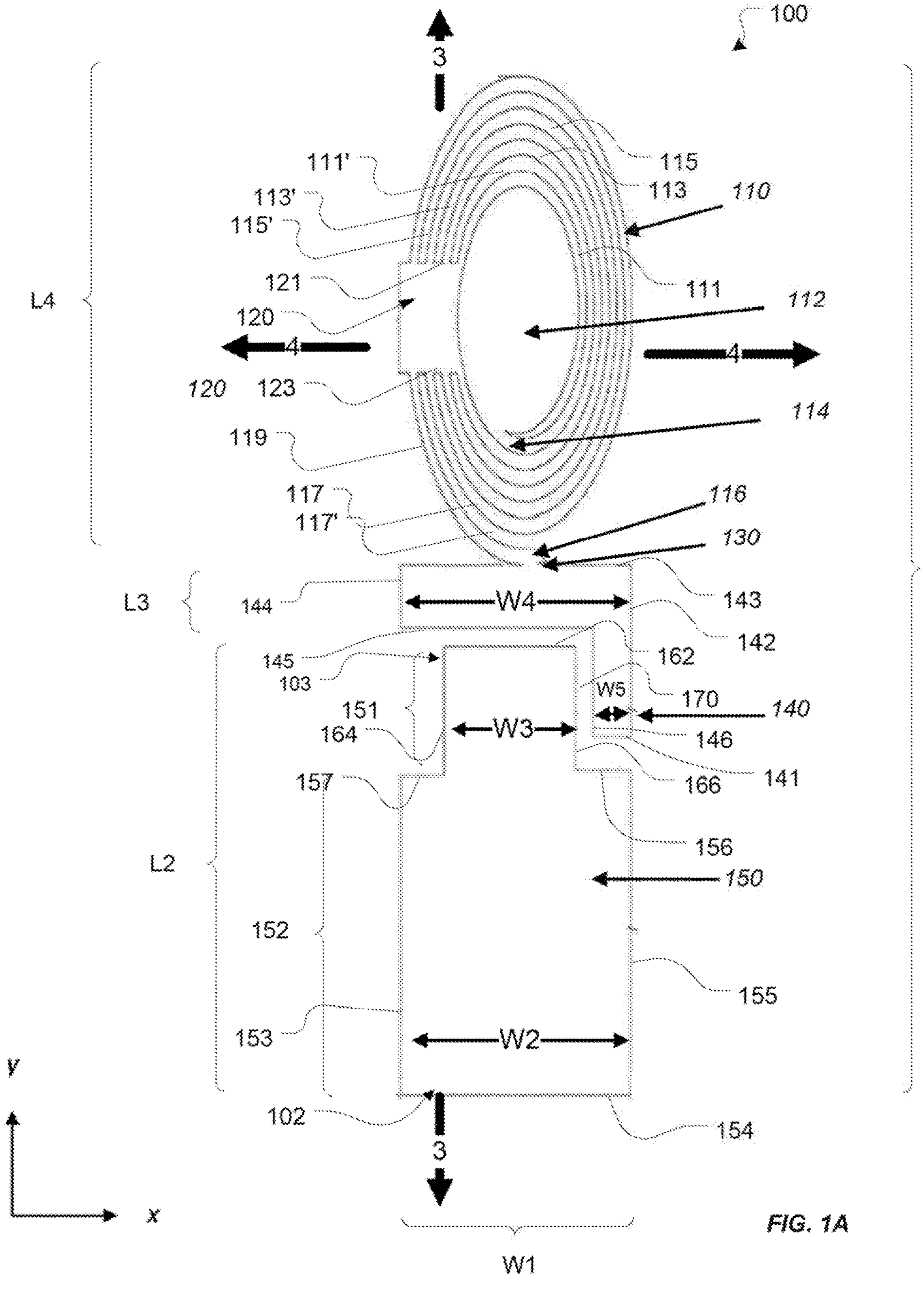
FIG. 1A is a top plan view of an embodiment of a wideband, low-frequency antenna including a spiral antenna element.
Figure 1B:
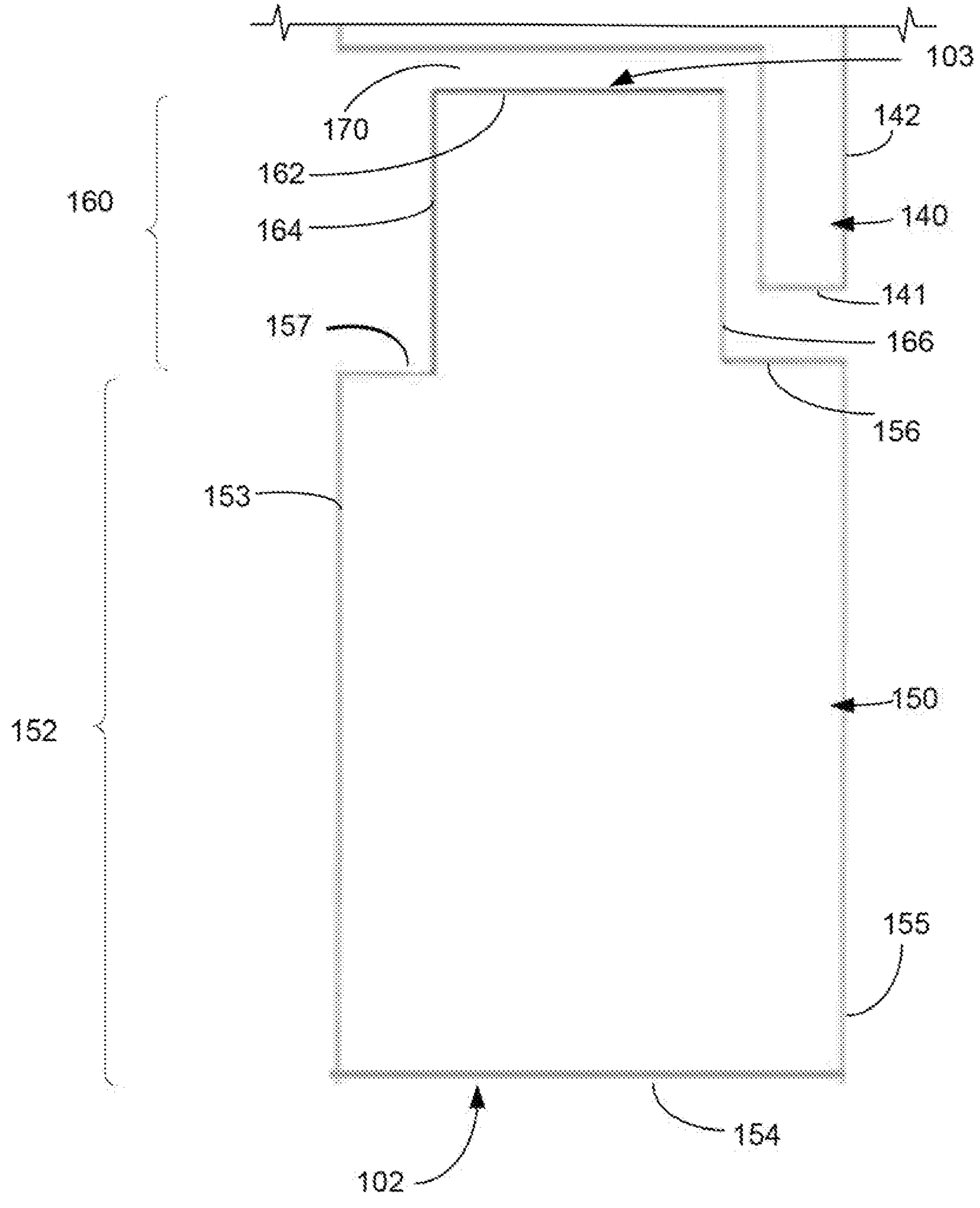
FIG. 1B is a detail view of a portion of the antenna of FIG. 1A containing the ground plane.
Figure 1C:
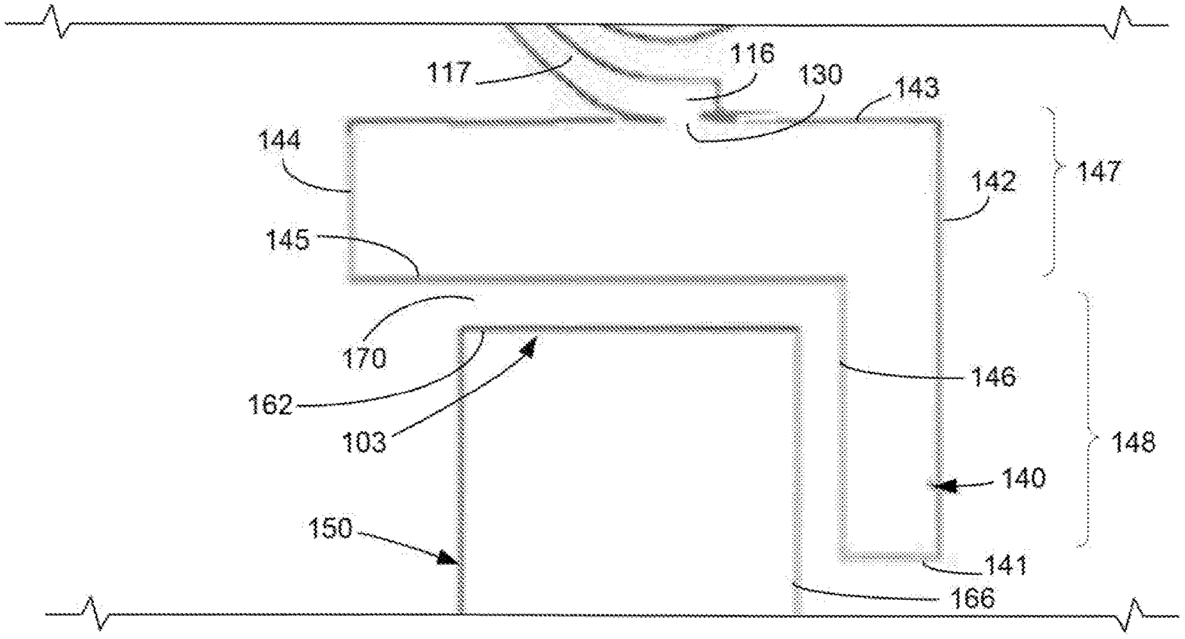
FIG. 1C is a detail view of a portion of the antenna of FIG. 1A containing the tuning stub.
Figure 1D:
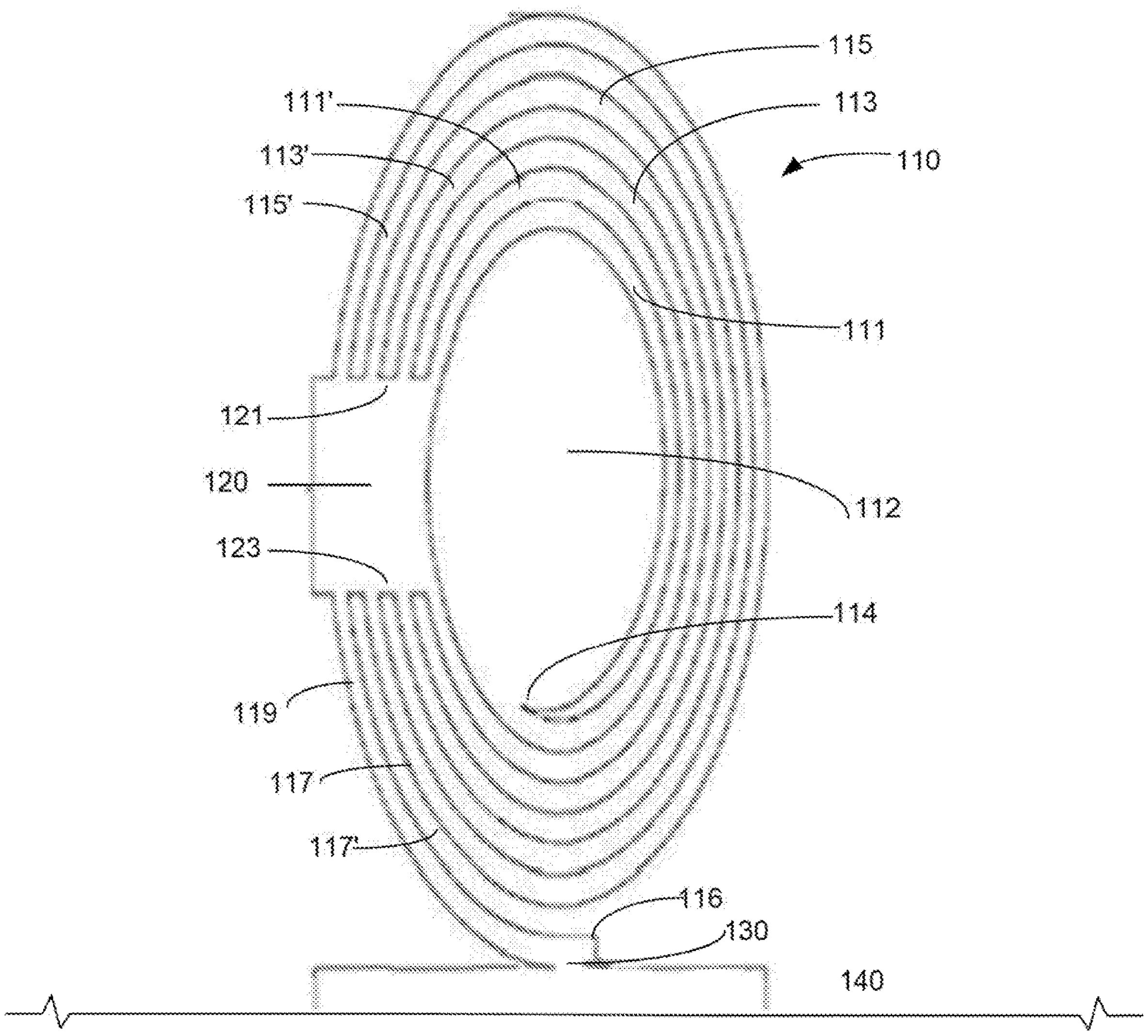
FIG. 1D is a detail view of a portion of the antenna of FIG. 1A containing the spiral antenna element.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Various embodiments of antennas are described herein. In some embodiments, an antenna may be a wideband, low frequency antenna having a spiral antenna element, and antennas including such a spiral antenna element may be referred to as a spiral antenna. In some embodiments, the antennas and the spiral antenna elements described herein may have compact footprints. In some embodiments, the antennas may have an input impedance of roughly 50 ohms. The spiral antenna elements may be edge-fed. The various embodiments of antennas described herein may provide additional bandwidth and a lower resonant frequency than other antenna designs with having a plurality of linear regions using a single spiral conductor. Embodiments of antennas described herein can function without a cavity backing.

The antennas described herein may be omnidirectional. Embodiments of antennas described herein may be configurable to operate at cellular bands within the range of 600 MHz-2700 MHz. Embodiments of antennas described herein may be configurable to operate at high frequency bands within the range of 3 GHz to 7 GHz. Other operating ranges may also be possible. In some particular embodiments, an antenna may be configured to operate the 600 MHz LTE 71 band, and/or at the CDARS 3.5 GHz band. The antennas may be linearly polarized.

FIG. 1 is a top plan view of a wideband, low-frequency antenna including a spiral antenna element. The antenna 100 may be linearly polarized with an omnidirectional antenna pattern. The antenna 100 does not require a short to ground.

In the illustrated embodiment, the components of the antenna 100 lie within a rectangular region having a total width W1 and a total length L1. An x-y coordinate system is depicted for convenience, but any suitable orientation of the antenna 100 and its constituent components may be used. Other shapes and configurations may be used in other embodiments. In addition, while asymmetrical elements of the antenna are depicted in a particular orientation, mirror images of portions of the antenna or of the entire antenna may also be used.

Figure 2:
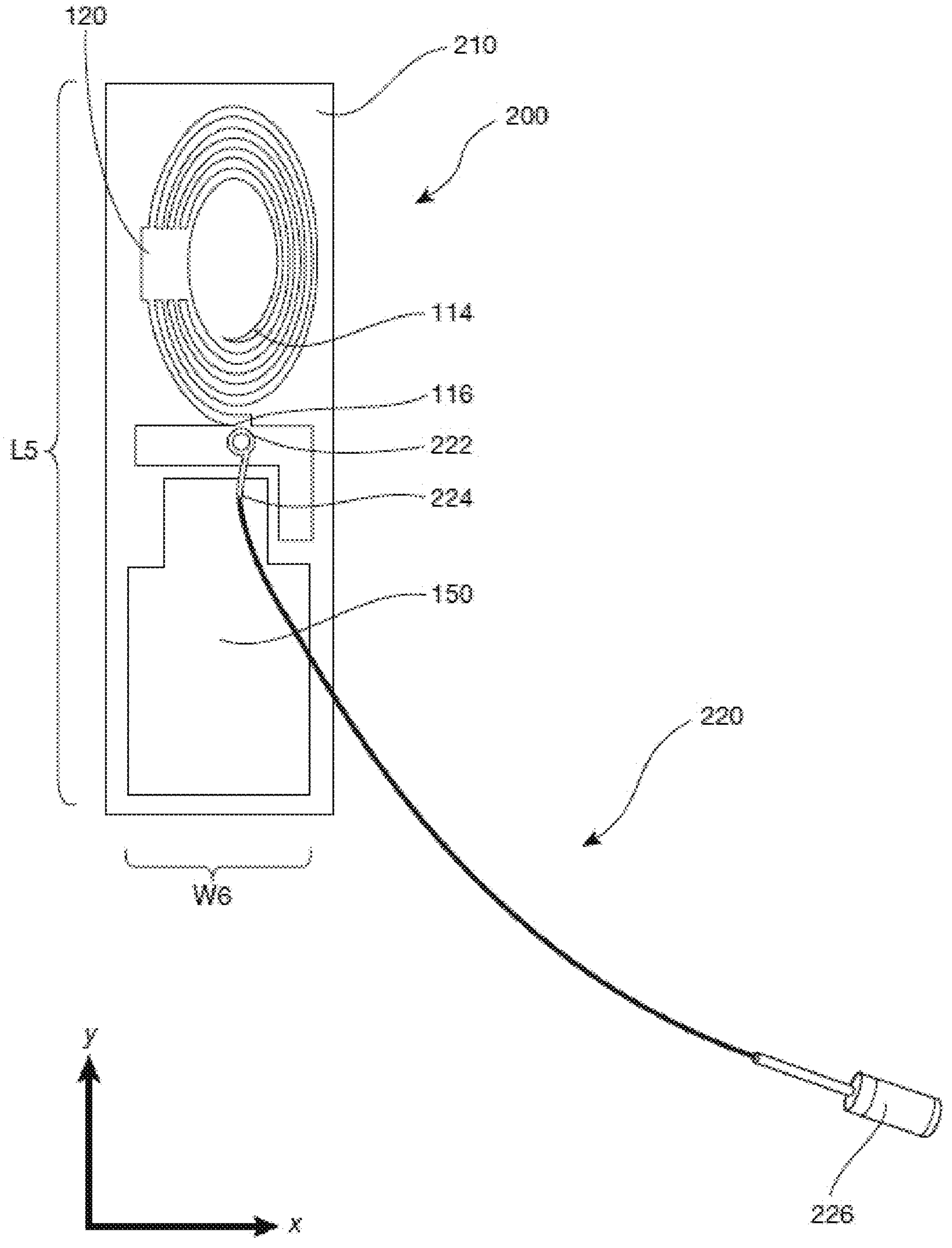
FIG. 2 is a top plan view of a wideband, low-frequency antenna including a spiral antenna element such as the antenna of FIG. 1, including a connector.

In some embodiments, the total width W1 of the antenna 100 configured as shown in FIG. 1 can be between about 25 mm and about 35 mm. In one embodiment, the total width W1 of the antenna 100 may be about 29.5 mm. In some embodiments, the total length L1 of the antenna 100 configured as shown in FIG. 1 can be between about 115 mm and about 145 mm. In one embodiment, the total width W1 of the antenna 100 may be about 129 mm. As will be appreciated by those skilled in the art, the overall length and width may vary when, for example, the antenna elements of the antenna 100 of FIG. 1 are arranged on a supporting substrate, as shown in FIG. 2.

The antenna 100 includes a ground plane 150. In the illustrated embodiment, the ground plane 150 comprises a wider region 152 at a first end 102 of the ground plane 150 further from the other components of the antenna 100 and having a width W2, and a narrower region 151 at a second end 103 of the ground plane 150 closer to the other components of the antenna 100 and having a width W3 narrower than the width W2. In the illustrated embodiment, the narrower region 151 at the second end 103 of the ground plane 150 may be offset in the x-direction from the center of the ground plane 150, such that the ground plane 150 has an asymmetrical T-shape. In other embodiments, the ground plane 150 may have other shapes, including rectangular shapes. In the illustrated embodiment, the area of the narrower region 151 may be smaller than the area of the wider region 152 of the ground plane 150.

In the illustrated embodiment, the first end 102 of the ground plane 150 has a first ground plane width W2 at a first end 102 along a first ground plane side 154 extending between second ground plane side 153 and third ground plane side 155. The first ground plane side 154 may be generally perpendicular to the second ground plane side 153 and third ground plane side 155.

At the second end 103 of the ground plane 150, the second end 103 of the ground plane 150 has a second ground plane width W3 along a fourth ground plane side 162 extending between a fifth ground plane side 164 and a sixth ground plane side 166. The fourth ground plane side 162 may be generally perpendicular to the fifth ground plane side 164 and the sixth ground plane side 166.

Between the first and second ends 102 and 103 of the ground plane 150, a seventh ground plane side 157 extends between the fifth ground plane side 164 and the second ground plane side 153. An eighth ground plane side 156 extends between the sixth ground plane side 162 and the third ground plane side 155. In the illustrate embodiments, the seventh ground plane side 157 and eighth ground plane sides 156 may be of different lengths, giving the T-shape of the ground plane 150 an asymmetrical shape. In other embodiments, the seventh ground plane side 157 and eighth ground plane sides 156 may be the same length. In some embodiments, as shown, the seventh ground plane side 157 and eighth ground plane sides 156 may be shorter than the first ground plane width W2.

In some embodiments, the seventh ground plane side 157 and eighth ground plane sides 156 may extend parallel to the first plane side 154, but in other embodiments they may extend at an angle. In some embodiments, the seventh ground plane side 157 and eighth ground plane sides 156 may be aligned with one another along a common line, but in other embodiments, the seventh ground plane side 157 and eighth ground plane sides 156 may be offset in the y-direction from one another.

Although the illustrated embodiment depicts the various ground plane edges meeting at discrete corners, the edges of the antenna can be rounded without departing from the scope of the disclosure. In various embodiments, adjacent edges that are more or less perpendicular to one another may operate within desired operational performance values.

The antenna also includes a tuning stub 140. In the illustrated embodiment, the tuning stub 140 is positioned adjacent the ground plane 150. In the illustrated embodiment, the tuning stub 140 includes a first section 147 having a width W4, and a second section 148 having a width W5.

The tuning stub 140 includes a first tuning stub side 141 which is positioned generally parallel to and spaced away from the eighth ground plane side 156 of the ground plane 150. A second tuning stub side 142 and a sixth tuning stub side 146 are spaced apart from one another by the width W5, and extend generally perpendicular to the first tuning stub side 141 at its first end. The sixth tuning stub side 146 extends generally parallel to the sixth ground plane side 166, and the second tuning stub side 142 extends in a parallel direction on the opposite side of the second section 148 from the sixth tuning stub side 146. In the illustrated embodiment the second tuning stub side 142 is longer than the sixth tuning stub side 146.

The fifth tuning stub side 145 extends generally parallel to and spaced away from the fourth ground plane side 166, and the third tuning stub side 143 extends in a parallel direction on the opposite side of the first section 147 from the fifth tuning stub side 145. In the illustrated embodiment the third tuning stub side 143 is longer than the sixth tuning stub side 146. The fourth tuning stub side 144 is spaced apart from a parallel section of the second tuning stub side 142 by the width W4. The fourth tuning stub side 144 is generally perpendicular to the third tuning stub side 143 and the fifth tuning stub side 145.

The ground plane gap 170 between the ground plane 150 and the tuning stub 140 may form an L-shape as shown. A first portion of the ground plane gap 170 extends between the sixth tuning stub side 146 and the sixth ground plane side 166, and is generally parallel to a second portion of the ground plane gap 170 extending between the fifth tuning stub side 145 and the fourth ground plane side 166. In the illustrated embodiment, the spacing between the ground plane 150 and the tuning stub 140 between the first tuning stub side 141 and the eighth ground plane side 156 is larger than the spacing in the L-shaped portion of the ground plane gap 170.

The dimension of the ground plane gap 170 may impact the lowest frequency supported by the antenna. In some embodiments, the dimension of the ground plane gap 170 may be optimized to support low frequency performance of the antenna. In some embodiments, the dimension of the ground plane gap 170 may be between about 1.9 mm and about 2.5 mm. In some embodiments, the dimension of the ground plane gap 170 may be about 2.27 mm.

Because the first section 147 and the second section 148 share the second side 142 of the tuning stub 140, the difference between the width W4 and the width W5 in the illustrated embodiment gives the tuning stub 140 an L-shape. In other embodiments, the tuning stub 140 may have any other suitable shape, such as a T-shape.

The antenna 100 also includes a single spiral element 110. The illustrated spiral element 110 has single interior end 114 located near a central point 112 within a central open region of the spiral element 110. The spiral element 110 also includes a single exterior end 116 which engages a side of the tuning stub 140 at a feed point 130.

In the illustrated embodiment, the spiral element 110 is a low band monopole that works against the ground plane 150. The spiral element 110 may function as a single arm which is edge-fed to produce an omnidirectional pattern. The spiral element 110 and the ground plane 150 may be arranged in a coplanar orientation on a single substrate, as discussed in greater detail with respect to subsequent figures.

As depicted, the spiral element 110 has a slightly elliptical shape with a length in the y-direction greater than a width in the x-direction. The spiral element 100 has a gradually widening curve centered around the central point 112. The illustrated spiral element 110 forms an Archimedean spiral with a polar angle.

As will be appreciated by those skilled in the art, changes can be made to the spiral dimensions and/or scale of the spiral element without departing from the scope of the disclosure. For example, the spiral element can be generally circular instead of generally elliptical. Additional conductive traces, such as copper traces, can also be included without departing from the scope of the disclosure. In various embodiments, the tightness of the spiral element 110 can be varied without significantly impacting performance.

A first curved arm 111 of the spiral element 110 curves counter-clockwise from the interior end 114 of the spiral element 110 to contact the shorting element 120 of the spiral element 110. The first curved arm 111 may also be referred to as a first curved trace or a first curved antenna trace. The shorting element 120 may also be referred to as a short, an arm connector, shorted spiral arm element. The shorting element 120 has a first spiral arm element side 121 and a second spiral arm element side 123. The first and second spiral arm element sides may also be referred to as first and second sides of the shorting element, or as first and second shorted spiral arm sides. A second curved arm 113 extends from the second spiral arm element side 123 of the shorting element 120 generally opposite the location where the first curved arm 111 engaged the first spiral arm element side 121 of the shorting element 120. Both ends of the second curved arm 113 engage the shorting element 120, with one of the ends of the curved arm 113 engaging the shorting element 120 at a point radially outward of the point at which the other of the ends of the curved arm 113 engages the shorting element 120. The second curved arm 113 cooperates with the shorting element 120 to enclose the first curved arm 111.

A third curved arm 115 extends from the second spiral arm element side 123 of the shorting element 120 opposite the location where the second curved arm 113 engaged the first spiral arm element side 121. A fourth curved arm 117 extends from the second spiral arm element side 123 of the shorting element 120 opposite the location where the third curved arm 115 engaged the first spiral arm element side 121. A fifth curved arm 119 extends counter-clockwise from the second spiral arm element side 123 of the shorting element 120 opposite the location where the fourth curved arm 117 engaged the first spiral arm element side 121. The fifth curved arm 119 engages the tuning stub 140 at a feed point 130. Each of the curved arms is separated from adjacent curved arms by one of spiral element gaps 111', 113', 115', 117'.

The spiral element 110 thus has an interior curved arm with a central end positioned interiorly and connected at a second side to the shorting element, one spiral arm with an exterior end positioned exteriorly and engaging the tuning stub and connected at a second side to the shorting element, and a plurality of spiral arms which connect at a first end to a first side of the shorting element stub and connect at a second side to the second side of the shorting element.

The location of the tuning stub 140 relative to the feed point 130 can be altered without departing from the scope of the disclosure. As will be appreciated by those skilled in the art, the tuning stub 140 can potentially be moved upward and downward and still maintain a desired performance for the antenna.

The conductive components of the antenna 100 may be formed from copper or any other suitable conductive material. Additionally, the total weight of all the conductive structures illustrated in FIG. 1 can be between 0.5 ounces and 1.5 ounces, and in some embodiments may be about 1 ounce. The copper or other conductive material can be deposited in a thickness between 17.8 um and 53.34 um, and in some embodiments may be about 35.56 mm. Any suitable dimension can be used for the shorted spiral element, which in some embodiments may not require a specific length.

The spiral shape of the spiral element 110 can in some embodiments be defined by an analytical equation and then scaled in one dimension so that the ending spiral is elliptical. Exemplary analytical equations to describe the depicted spiral can be, for example:

$$X(t) = R0*\sin(t)*\text{rate}*t, \tag{1}$$

$$Y(t) = R0*\cos(t)*\text{rate}*t, \tag{2}$$

where R0 and rate represent constants with values of 6 and 0.22, respectively.

In the illustrated embodiment, the center-left portion of the spiral element 110 has all of the curved arms connected together (or shorted) to provide an inductive element.

The curved arms are shorted by engaging the shorting element 120 to increase the intrinsic inductance of the spiral element 110 structure and to combat capacitance between each pair of adjacent spiral arms. Capacitance between adjacent pairs of spiral arms can decrease the overall bandwidth of the antenna.

The spiral element 110 also forms a semi-regular resonance which is similar to a center-fed spiral element which may be used in other embodiments. This allows for performance of up to about 7 GHz. The spiral element 110 can be integrally formed such that the spiral arms and the shorted spiral arm element are formed as a single unitary element, or are formed to function as a single unitary element.

The measured efficiency at cellular bands 600 MHz-2700 MHz, has a return loss of between −5 dB and −35 dB and an efficiency of between 20% and 80%. The measured efficiency at the high frequency bands 3 GHz to 7 GHz has a return loss of between −10 dB and −5 dB and an efficiency of between 10% and 80%. The spiral structure also allows for the peak gain of the antenna to be maximally flat and low (~2 dBi) in the high band of 1700 MHz to about 2700 MHz.

FIG. 2 is a planar view of a spiral, wideband, low-frequency antenna 200 such as the antenna 100 of FIG. 1, positioned on a substrate 210 and connected to a connector 226 via a cable 220 having a first end and a second end. The cable 220 has a first connection point 222 at a first end on the tuning stub 140 adjacent the feed point 130 and a second connection point 224 on the ground plane 150 near the first end. The second connection point 224 can be positioned at or near the fourth ground plane side 162.

The cable 200 includes a connector 226 on the second end of the cable 220. The cable 200 may be a coaxial cable, and may form an unbalanced feedline as part of the antenna 200. The connector 226 can be any suitable connector, such as an SMA female connector, for example. The substrate 210 can have a width W6 that is wider than the total width W1 of the antenna, or of the widest portion of the ground plane 150, first ground plane width W2 and a length L5 that is greater than the overall antenna length L1. The dimensions of the substrate 210 may be depend on both the design and the relative arrangement of the various components of the antenna 200. The coaxial cable forms an unbalanced feedline as part of the antenna.

Figure 3:
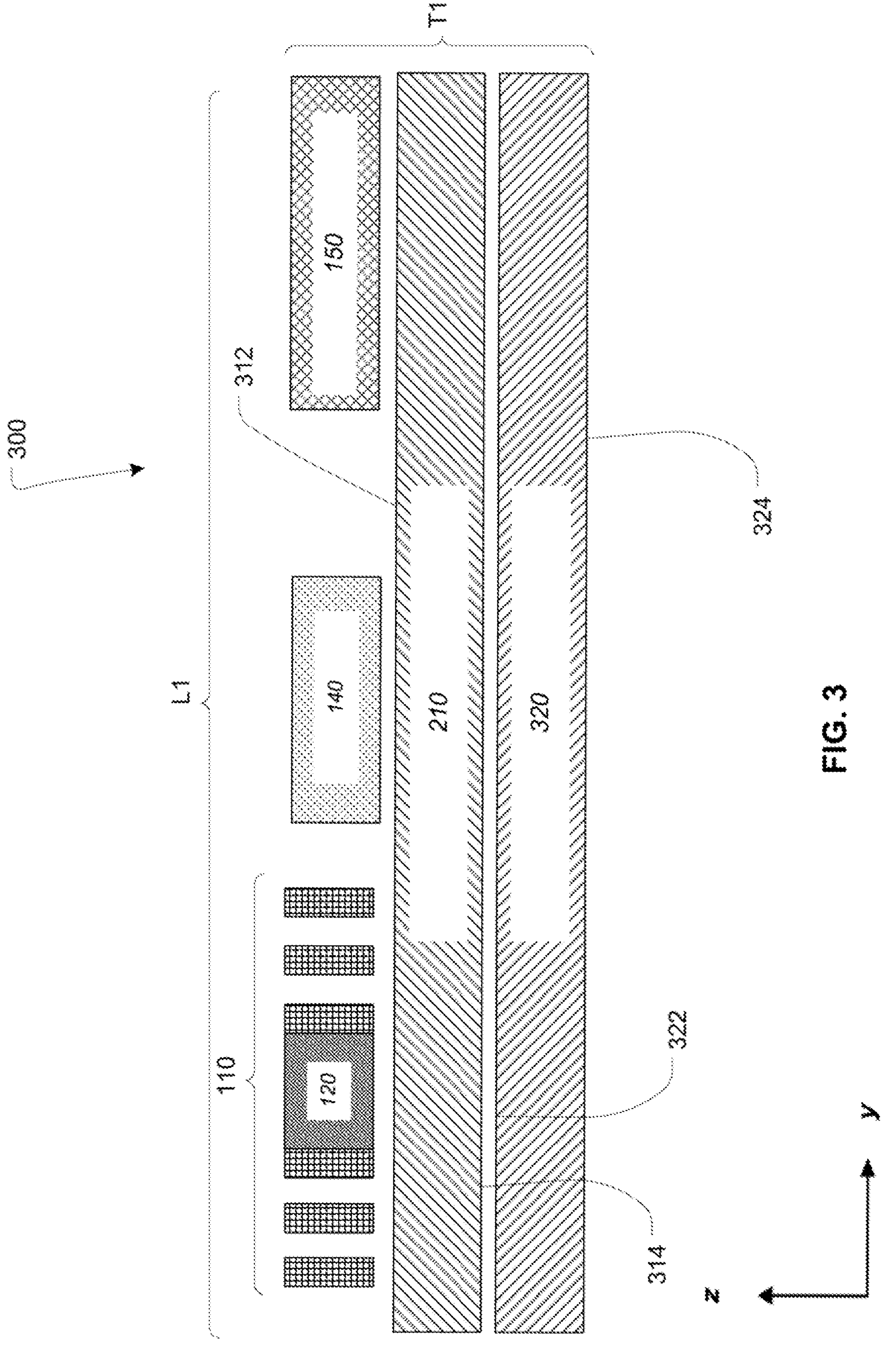
FIG. 3 is an exploded cross-sectional view of an antenna such as the antenna of FIG. 1, taken along the line 3-3 of FIG. 1.

FIG. 3 is an exploded cross-section of an embodiment of a spiral, wideband, low-frequency antenna 300 such as the antenna 100 of FIG. 1, taken along the lines 3-3 in FIG. 1 in the y-z plane, perpendicular to the x-y plane shown in FIG. 1. The layers of the antenna 300 are shown with a horizontally extending gap between each layer for purposes of illustrating the various layers. The spiral element 110, tuning stub 140, and ground plane 150 are positioned on a first surface 312 of a substrate 210.

The substrate 210 can be a flexible substrate or an inflexible substrate. Suitable materials for the substrate 210 include, but are not limited to, a suitable dielectric material such as glass-fiber reinforced PTFE laminate, or a flexible material such as a polyimide (Kapton®) substrate. The antenna 300 can also include an adhesive layer 320 or another suitable adhesive structure or material, which may be provided on a second surface 314 of substrate 210. The adhesive layer 320 may have a first surface 322, facing the substrate 210, and a second surface 324 which may be configured to engage a mounting surface (not shown in FIG. 3) where the antenna 300 is to be mounted during use. Suitable adhesive materials include, but are not limited to 2M Fastbond™ foam adhesive.

Figure 4A:
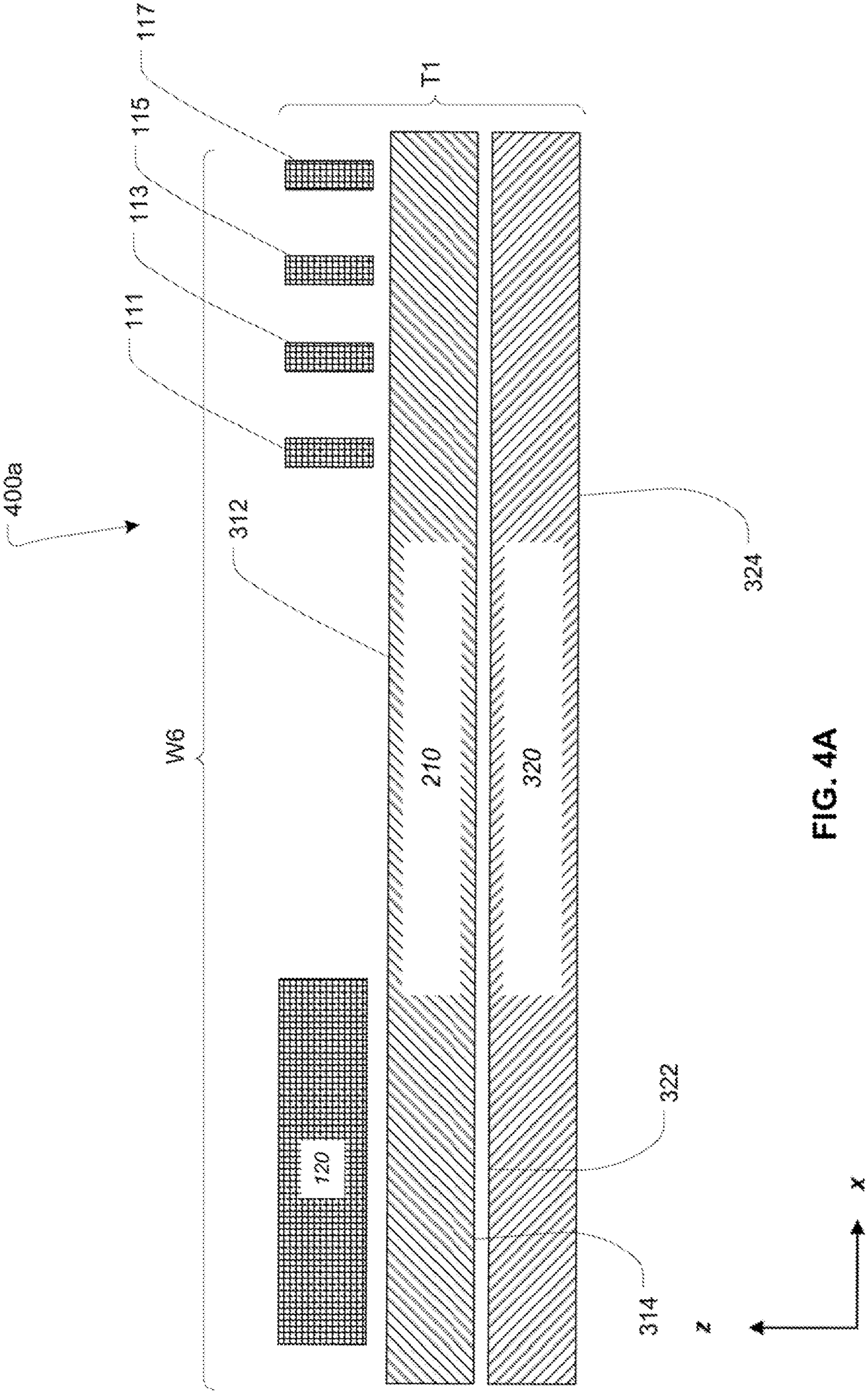
FIG. 4A is an exploded cross-sectional view of one embodiment of an antenna such as the antenna of FIG. 1, taken along the line 4-4 of FIG. 1.
Figure 4B:
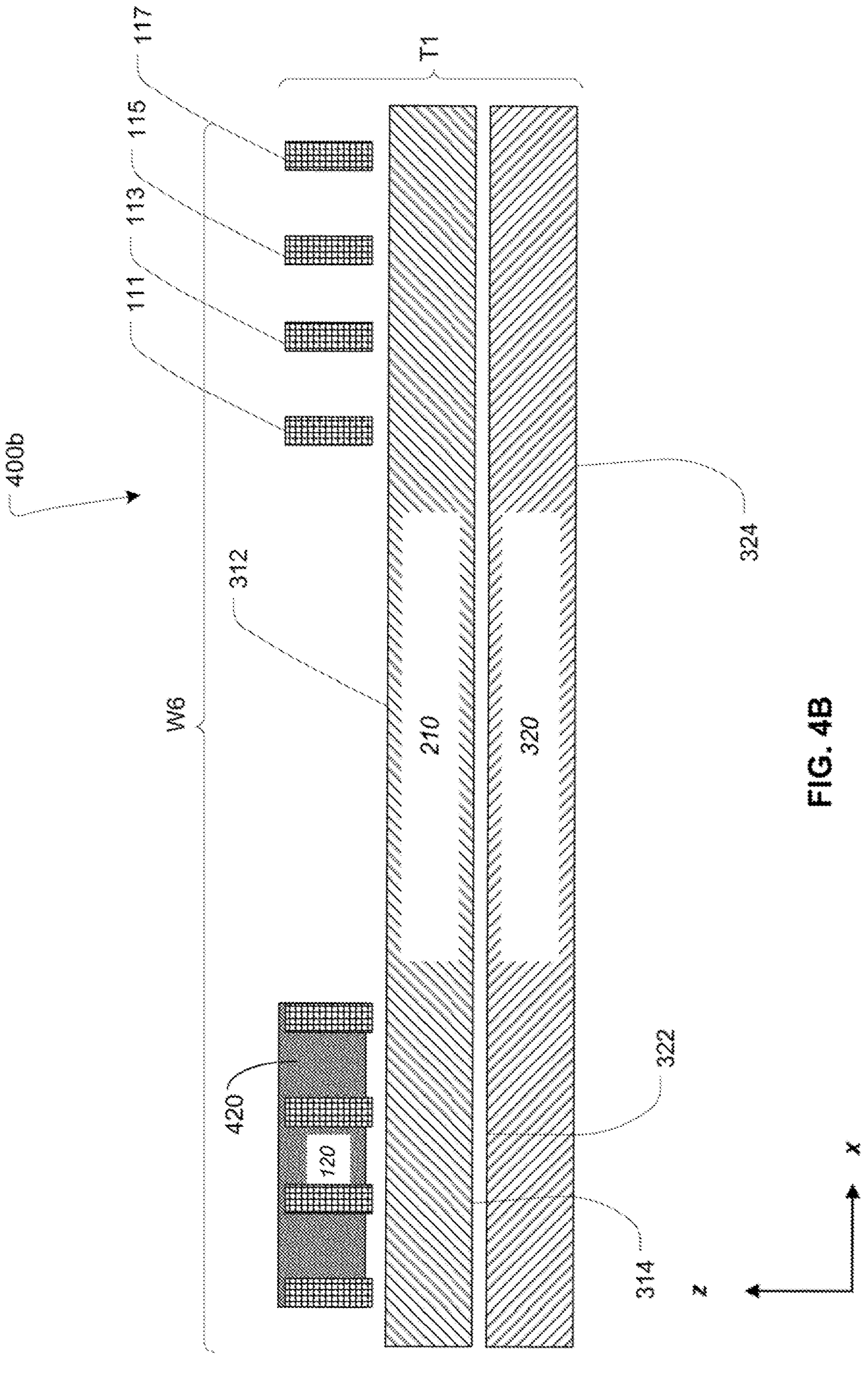
FIG. 4B is an exploded cross-sectional view of an alternative embodiment of an antenna such as the antenna of FIG. 1, taken along the line 4-4 of FIG. 1.

FIGS. 4A and 4B are exploded cross-sectional view of one embodiment of an antenna such as the antenna of FIG. 1, taken along the line 4-4 of FIG. 1. In the embodiment shown in FIG. 4A, the curved arms 111, 113, 115, and 117 are contiguous with the shorting element 120. In the embodiment shown in FIG. 4B, the curved arms 111, 113, 115, and 117 are shorted by a layer 420 that fills the gaps between the curved arms 111, 113, 115, and 117 on one side of the spiral element 110.

In some embodiments, an antenna configured as illustrated in the figures may be designed to lay flat on a substrate, such as on a 1.5 mm piece of ABS plastic material. In some embodiments, the antenna is flexible and can be installed on a curved surface which may include corners. Change in specific antenna performance related to the installation environment will be a function of the particular radiation environment the antenna is placed in, as will be appreciated by those skilled in the art.

In some embodiments, the antenna design may be computer generated or otherwise created, and then exported to a format that allows a copper cutter machine to cut out the desired copper traces from a portion of copper tape. The tape can then be pasted onto a piece of plastic. The antenna may be mounted on the side of a plastic enclosure. A coaxial cable may be soldered onto the antenna and the ground of the cable may be soldered to the ground plane of the antenna. The center conductor of the cable may be soldered to the feed location on the antenna structure.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define embodiments within the scope of the invention and that methods and structures within the scope of these claims and their equivalents be covered thereby.

The invention claimed is:

1. An antenna, comprising:
- a substrate;
- a spiral element that is supported by a first region of the substrate, the spiral element comprising:
  - a plurality of curved arms of conductive material with each of the curved arms having a different length as compared with other ones of the curved arms, each of the plurality of curved arms being elliptical in shape; and
  - a shorting element comprised of the conductive material, the shorting element comprising a first end and a second end, the second end being on an opposing side of the shorting element from the first end, the shorting element being connected with each of the plurality of curved arms at the first end and/or the second end;
- a tuning stub comprised of the conductive material, the tuning stub being connected with one of the plurality of curved arms; and
- a ground plane comprised of the conductive material, the ground plane being galvanically isolated from both the tuning stub and the spiral element.

2. The antenna of claim 1, wherein the tuning stub comprises an L-shaped portion of the conductive material.

3. The antenna of claim 2, wherein the ground plane comprises a T-shaped portion of the conductive material.

4. The antenna of claim 3, wherein the spiral element further comprises a central region free from the conductive material, the plurality of curved arms being disposed around the central region.

5. The antenna of claim 4, wherein the T-shaped portion of the ground plane comprises an asymmetrical T-shaped portion.

6. The antenna of claim 5, wherein each of the plurality of curved arms is elongated in a first direction having a major dimension and a minor dimension that is perpendicular to the major dimension.

7. The antenna of claim 6, wherein a second region of the substrate comprises two pads, a first one of the two pads being configured for connection with an interior portion of a coaxial cable and a second one of the two pads being configured for connection with an exterior portion of the coaxial cable.

8. The antenna of claim 7, wherein the first one of the two pads is located more proximate to the spiral element than the second one of the two pads.

9. The antenna of claim 8, wherein the first one of the two pads is disposed within the tuning stub of the antenna.

10. The antenna of claim 9, wherein the second one of the two pads is disposed within the ground plane of the antenna.

11. The antenna of claim 10, wherein the asymmetrical T-shaped ground plane comprises a first rectangular portion comprised of a first length dimension and a first width dimension and a second rectangular portion comprised of a second length dimension and a second width dimension;
- wherein the first length dimension is smaller in dimension than the second length dimension; and
- wherein the first width dimension is smaller in dimension than the second width dimension.

12. The antenna of claim 11, wherein the L-shaped tuning stub comprises a first arm and a second arm, the first arm comprising a first area of the conductive material and the second arm comprising a second area of the conductive material, the first area being larger in dimension than the second area.

13. The antenna of claim 12, wherein the first arm and the second arm of the L-shaped tuning stub are each disposed adjacent a separate side of the first rectangular portion of the ground plane.

14. The antenna of claim 13, wherein a center of the first width dimension of the asymmetrical T-shaped ground plane is offset from a second of the second width dimension of the asymmetrical T-shaped ground plane.

15. The antenna of claim 1, wherein the first end of the shorting element is connected with a first portion of the plurality of curved arms and the second end of the shorting element that is disposed opposite from the first end of the shorting element is connected with a second portion of the plurality of curved arms.

16. The antenna of claim 15, wherein the first portion of the plurality of curved arms is equal in number to the second portion of the plurality of curved arms.

17. The antenna of claim 16, wherein the substrate comprises a flexible substrate that comprises an adhesive layer.

18. An antenna, comprising:
- a substrate;
- a spiral element that is supported by a first region of the substrate, the spiral element comprising:
  - a plurality of curved arms of conductive material with each of the curved arms having a different length as compared with other ones of the curved arms, each of the plurality of curved arms being elliptical in shape; and
  - a shorting element comprised of the conductive material, the shorting element comprising a first end and a second end, the second end being on an opposing side of the shorting element from the first end, the shorting element being connected with each of the plurality of curved arms at the first end and/or the second end;
- a tuning stub comprised of the conductive material, the tuning stub being connected with one of the plurality of curved arms;
- a ground plane comprised of the conductive material, the ground plane being galvanically isolated from both the tuning stub and the spiral element; and
- a coaxial cable that is disposed in a second region of the substrate, an interior portion of the coaxial cable being connected with the tuning stub and an outer portion of the coaxial cable being connected with the ground plane.

19. The antenna of claim 18, wherein the tuning stub comprises an L-shaped portion of conductive material.

20. The antenna of claim 19, wherein the ground plane comprises a T-shaped portion of the conductive material.

* * * * *